Oct. 21, 1952 L. D. HOLMES ET AL 2,614,504
VEHICLE BODY SUPPORT
Filed March 31, 1950 5 Sheets-Sheet 5
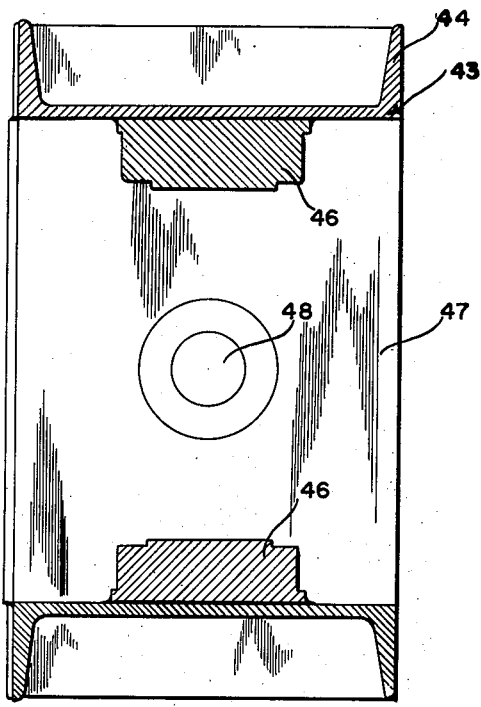
FIG.-6
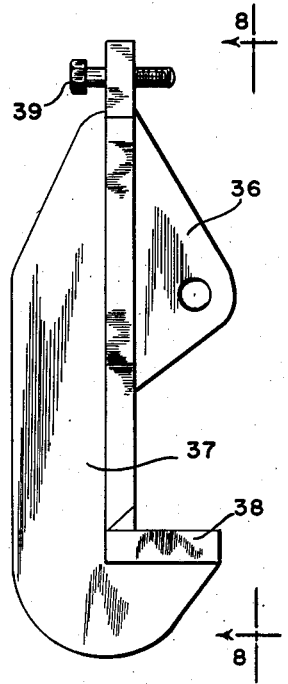
FIG.-7
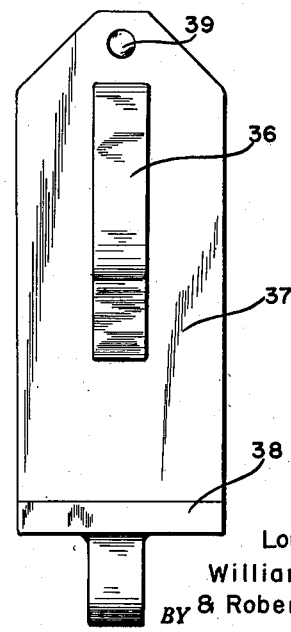
FIG.-8
INVENTORS
Louis D. Holmes,
William J. Haaksma
BY & Robert S. Hammond
ATTORNEY Patented Oct. 21, 1952

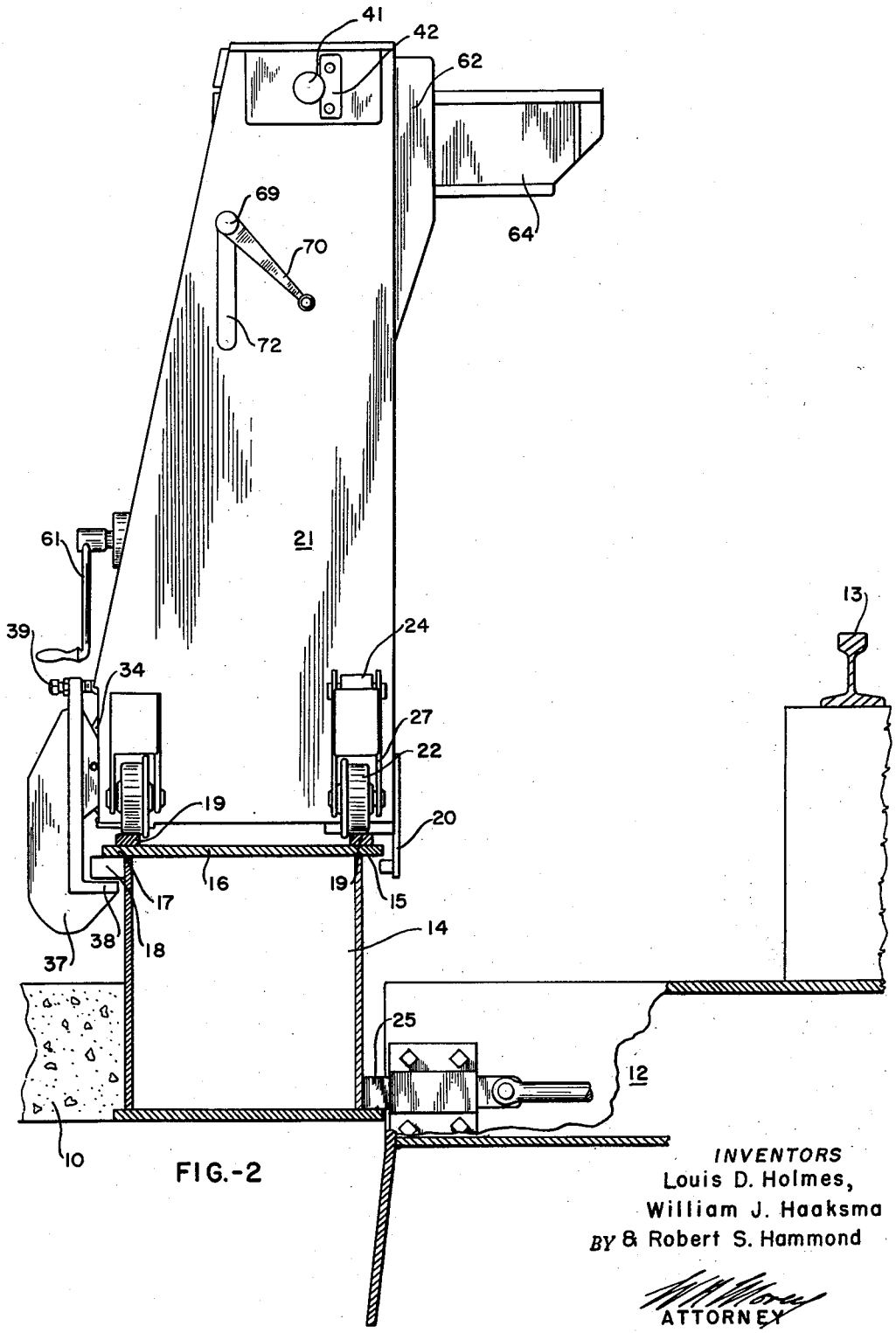
FIG.-2
INVENTORS
Louis D. Holmes,
William J. Haaksma
BY & Robert S. Hammond
ATTORNEY

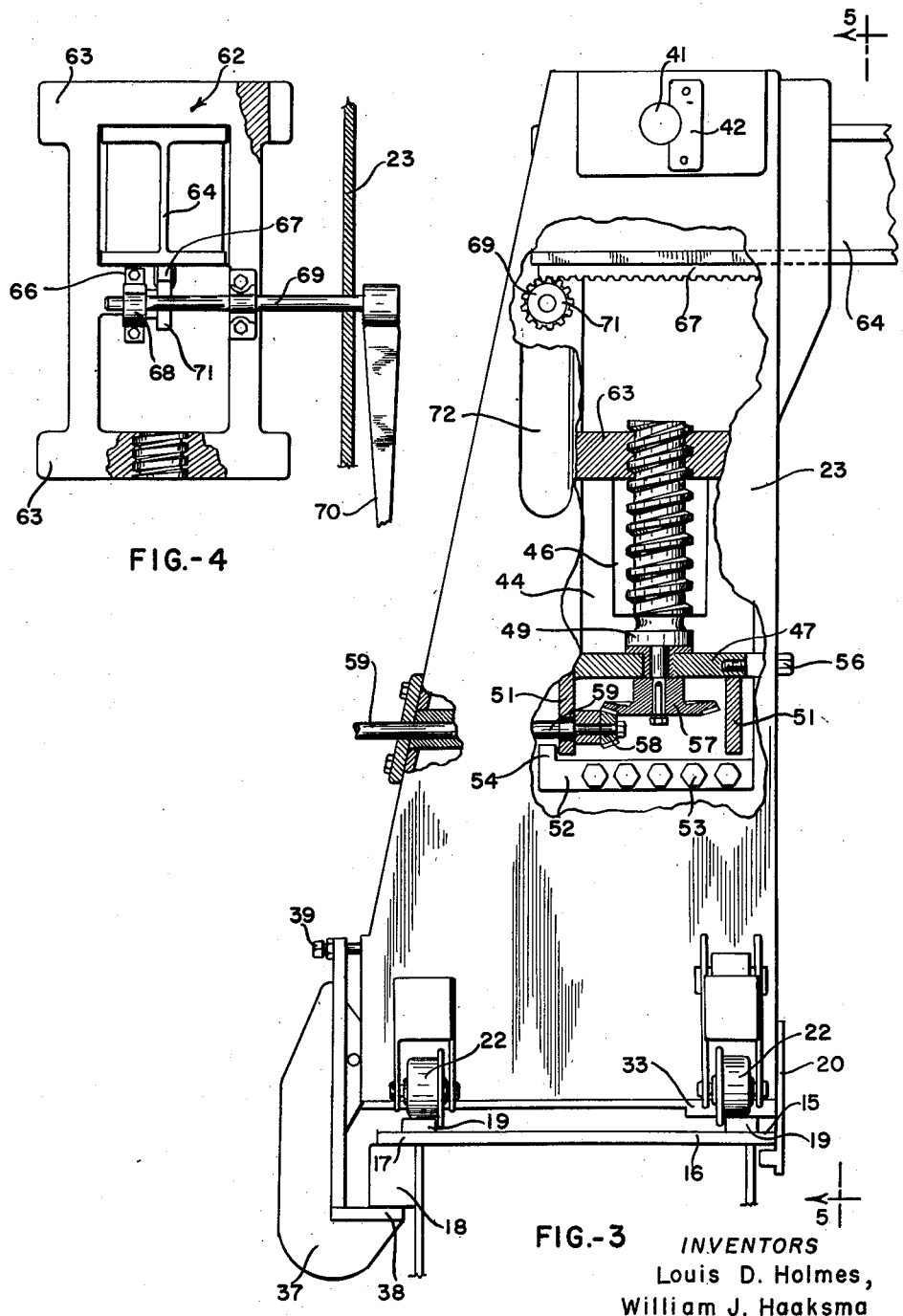

2,614,504

UNITED STATES PATENT OFFICE 2,614,504

VEHICLE BODY SUPPORT

Louis D. Holmes, Blue Island, William J. Haaksma, Harvey, and Robert S. Hammond, Winnetka, Ill., assignors to Whiting Corporation, a corporation of Illinois Application March 31, 1950, Serial No. 153,202

12 Claims. (Cl. 104—32)

Our invention refers to apparatus for supporting railway vehicles and the like in elevated position, and is particularly well adapted for use in conjunction with drop table installations.

To properly service or repair the running gear of railway vehicles, as by the replacement of truck or axle assemblies, the body of the vehicle must be supported in such manner as to permit lowering of the truck or axle a distance sufficient to effect disengagement. One of the most efficient and widely employed means for performing this operation is to position the vehicle truck on a top spanning a transversely extending pit. The vehicle body is then elevated a short distance and engaged by body supports, after which a drop table operating in the pit lowers the top and truck and moves to a release track, where the truck is removed from the top for repair.

Considerable difficulty has been encountered in properly supporting the vehicle body during such operations, since the height of the vehicle floor level, the body width, and the position of jacking pads on the vehicle body varies considerably from vehicle to vehicle. The various expedients heretofore utilized to cope with these variations, such as the use of blocks or special adapters, have not been considered satisfactory, since considerable labor is frequently involved in their use, and in some instances the stability of the supported vehicle body is questionable.

One of the principal objects of this invention is to provide a body support for vehicles and the like, which is particularly well-adapted for use in conjunction with drop table installations.

Other important objects include the provision of such a body support, which utilizes transverse girders disposed near shop floor level, which is highly stable, easily moved and adjusted, simply constructed, which incorporates means for correcting errors in the alignment of guides and moving portions, and which may in modified form be employed for elevating the vehicle body.

Further objects, as well as many of the outstanding advantages of our invention, will be disclosed in the following description and in the appended drawings, in which:

Fig. 2 is a partial elevation of a part of our improved body support device illustrating its relationship to a drop table top;

Fig. 3 is a partially broken away elevation of the movable pillar utilized in our device;

Fig. 4 is a partial end elevation of a sliding block operating within the pillar;

Fig. 6 is a partial horizontal cross section of the block guide assembly within the pillar;

Fig. 7 is a side view of a stabilizing hook; and

Fig. 8 is a view taken along the line 8—8 of Fig. 7.

In brief, our body support in its preferred form utilizes a pair of box girders disposed in parallel relationship on either side of a vehicle track and at or near shop floor level. A flange extends along the upper and outer edge of each of the girders. Movable pillars slide along rails formed on the top of the girders and are provided with stabilizing hooks which extend downwardly and inwardly from the pillar to a point immediately beneath the girder flange in such manner as to resist any tendency for the pillar to tip inwardly towards the vehicle. Within the girder is a vertically sliding block, which supports a horizontally sliding body support beam. The guides upon which the block slides are mounted in a unique manner, which permits both alignment and adjustment when necessary. The body support arm is moved laterally by a rack and pinion arrangement, while the block is moved upwardly and downwardly in the guides by a screw jack or the like.

Ordinarily, the drop table, in connection with which this device is utilized, is used to perform whatever lifting function is required; but if such device is not available, or if desired for other reasons, the jack or block-moving device within the pillar may be motorized and of such capacity as to perform a vehicle lifting operation. Thus, it may be seen that the point at which the body support engages the vehicle body can be varied at will within the capacity of the apparatus by horizontal movement of the pillar, vertical movement of the block, or lateral movement of the support arm. Stability is insured by the stabilizing hook, and by the unique wheel suspension applied in supporting the movable pillar on rail wheels. Since the girders are mounted near shop floor level, and usually extend across the drop table pit, the drop table tops may be locked directly into the girders, rather than into openings formed in the pit wall or in the shop floor. In addition, the support girder may in part serve as a structural member of the building by supporting a floor between adjacent body support installations.

Figure 1:
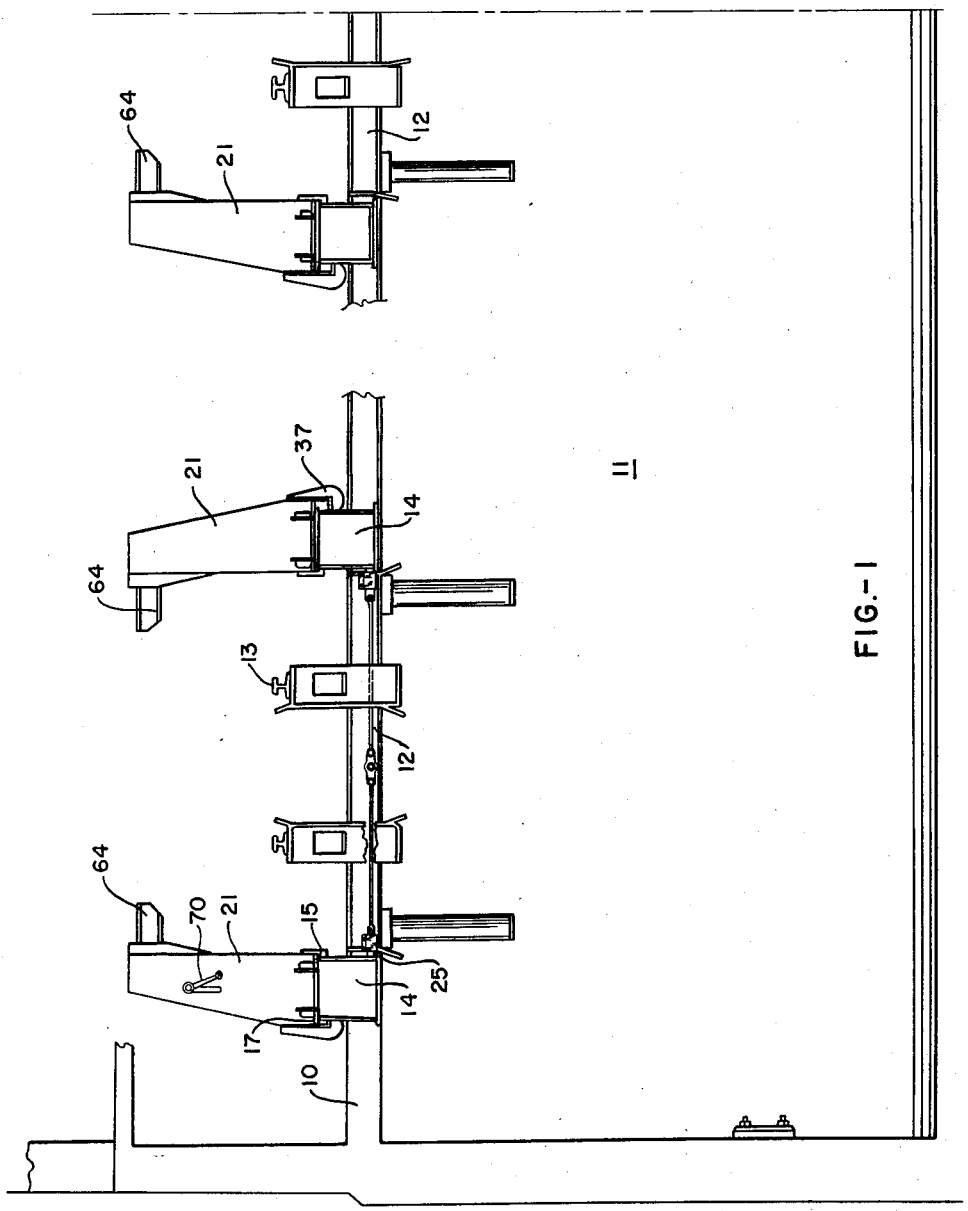
Fig. 1 is a partial schematic elevation of a typical drop table installation utilizing our improved body supports.

In Fig. 1, we have illustrated diagrammatically the arrangement for a body support device as applied to a typical drop table installation. Such devices are ordinarily employed in a railway repair shop building having a shop floor 10 beneath which a drop table pit 11 extends. Extending across the pit 11 near shop floor level are tops 12, which bridge the pit and permit the passage of a vehicle on rail sections 13 mounted on the top 12. Box girders 14, or the like, extend across the pit 11 parallel to each other and on either side of the top 12, providing at least partial support for sections of the shop floor 10, which extend over the pit 11 between the body support girders 14. The tops 12 are releasably supported at shop floor level by retractable locking arms 25, which preferably extend laterally from the tops 12 into engagement with the girders 14.

As best shown in Fig. 2, each of the girders 14 preferably includes a top member 16, which extends outwardly beyond the sides of the girders 14, defining a flange 17. If desired, a rail 18 may be secured, as by welding, to the lower surface of the flange along the outer side of the girder 14. Preferably, although not necessarily, the top member 16 extends inwardly a slight distance beyond the inner side of the girder 14 forming a flange 15.

Parallel rails 19, mounted on the upper surface of the top member 16, support a pillar, generally designated 21, having four wheels 22. The pillar 21 includes an upwardly extending hollow housing 23 of generally rectangular horizontal cross section.

Figure 5:
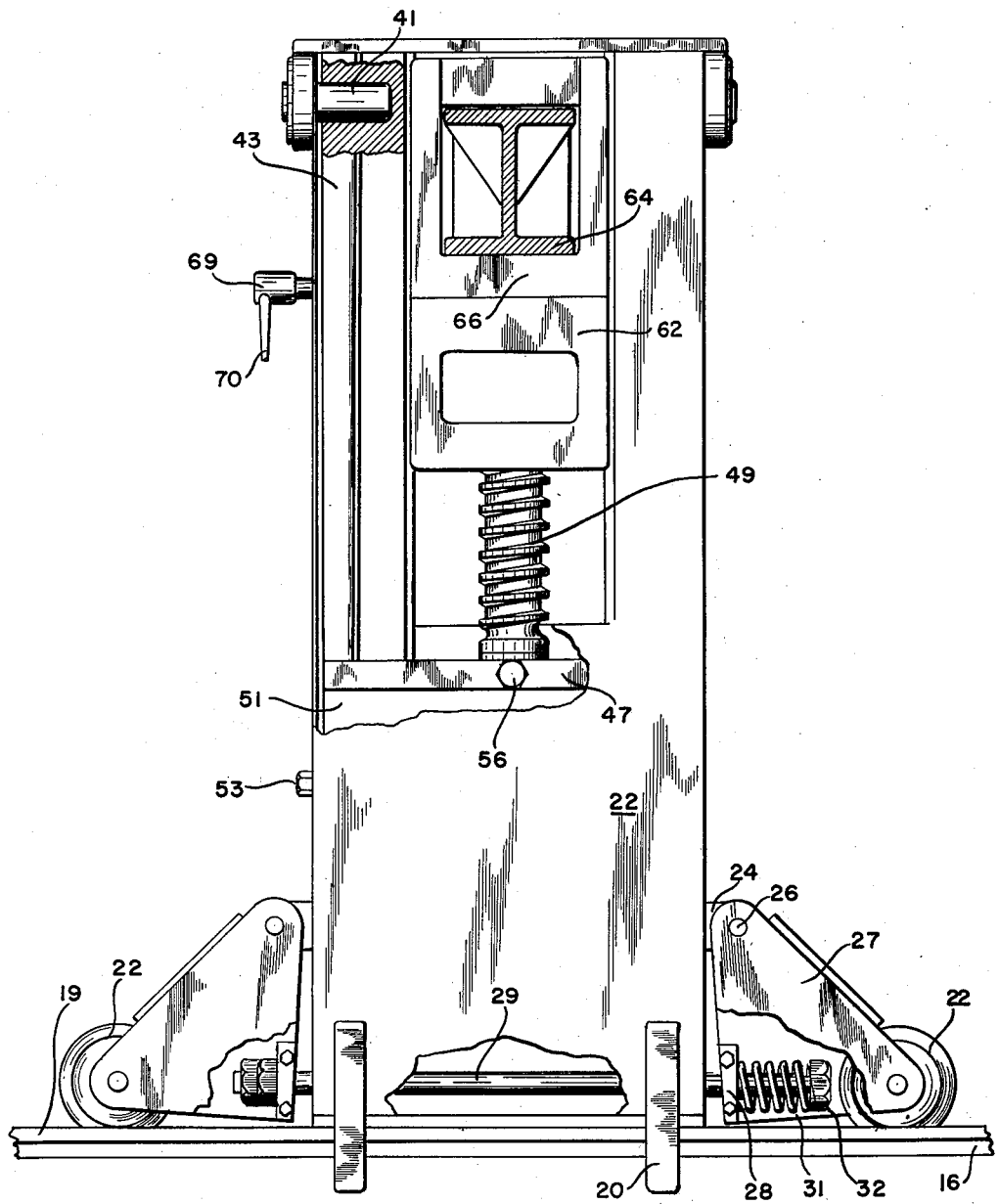
Fig. 5 is a partially broken away front elevation of the pillar.

As shown in Fig. 5, four ears 24 extend outwardly on opposite sides of the housing 23 in alignment with the rails 19, and are bored to receive pivot pins 26, which engage and pivotally support triangular members 27. The wheels 22 are journaled to the lower outer ends of the members 27 and are flanged to prevent derailment of the wheels 22. The members 27 supporting the wheels 22 running along the rail nearest the flange 17 may be fixed to the housing 23, thus rigidly supporting the outer portion of the pillar. The members 27 supporting the inner set of wheels 22 are, however, provided with brackets 28, which receive a horizontal rod 29, the outer ends of which are threaded. A spring 31 is interposed between one of the brackets 28 and an end nut 32 in such manner as to normally urge the lower inner corners of the members 27 towards each other, thereby supporting the inner portion of the pillar out of engagement with the rail 19. The strength of the spring 31 is selected, however, to yield under the pressure of a load applied to the pillar sufficiently to bring a plate 33 secured across the bottom of the housing 23 into contact with the inner rail 19.

A pair of ears 34, extending laterally from the outer side of the housing 23 near the base, pivotally engage ears 36 formed on stabilizing hooks 37. The hooks 37 extend downwardly to a point below the rail 19 and inwardly, forming a lip 38 immediately below the rail 18 in such manner as to engage the rail 18 when the pillar 21 tips inwardly. An adjusting screw 39 may extend through a threaded opening formed in the upper portion of the hook into engagement with the housing 23.

Fixed stabilizing hooks 20 may be fixed to the inner face of the housing and extend downwardly and inwardly for engagement with the flange 15 when the pillar 21 tips outwardly.

Heavy, generally horizontal stub-pins 41, held in place by suitable keepers 42, extend inwardly from opposite ends of the housing 23 and pivotally support a guide assembly, generally designated 43. The guide assembly may be formed of a pair of parallel opposed channel members 44 having inwardly extending parallel guides 46 welded to their faces. The lower extremities of the channels 44 and guides 46 are connected by a heavy horizontal plate 47 having a centrally disposed opening 48, which rotatably receives and supports an upright screw 49. Cross supports 51 extend downwardly from the plate 47 and rest upon L-shaped members 52 held in position on the inner surface of the housing 23 by a plurality of bolts 53. A lip 54 formed on the member 52, which is adjustable as to position, prevents rotation of the guide assembly 43 about its pivot point 41 in a clockwise direction by engagement with one of the members 51. Adjusting bolts 56 extend inwardly from the inner face of the housing 23 into engagement with the plate 47 and are utilized in conjunction with the member 52 to obtain satisfactory vertical alignment of the guide assembly 43. The screw 49 is journaled in the plate 47 and projects downwardly into the space between the members 51, where it is secured to a bevel gear 57, or the like. A pinion 58 meshes with the gear 57 and is secured to a pinion shaft 59, which projects outwardly through the housing 23 to a crank 61, or the like. Obviously, a worm and worm wheel may be substituted for the gear 57 and pinion 58, if desired, and may be driven by a suitable motor, rather than by a crank or hand wheel 61.

A block, generally designated 62, is formed with upper and lower flanges 63 suitably grooved for sliding engagement with the guides 46 in the guide assembly 43. The block 62 defines a transverse opening, which slidably receives a body support arm 64, suitably in the shape of an I-beam. The lower flange 63 of the block 62 is disposed considerably below the lower face of the I-beam 64, which rests upon an intermediate support member 66. Lower flange 63 is threaded to receive the screw 49. The body support arm 64 is provided on its lower surface with a rack 67, which fits into a horizontal groove formed in the intermediate member 66. Upon the rear face of the block 62 are brackets 68, which rotatably support a shaft 69 having an external handle 70. A gear 71 is secured to the shaft 69 and engages the rack 67, thus providing means for moving the support arm 64 inwardly and outwardly with respect to the block 62. The shaft 69 extends outwardly through the housing 23, a slot 72 being formed therein to permit the vertical movement of the block 62.

In operation, the vehicle to be serviced is moved along the shop rails until the desired truck is supported by the rail sections 13 on the top 12. Usually, a drop table is moved into position beneath the top 12 at this point, and the table moved upwardly into supporting engagement with the top. The bars 25, which hold the top in position are then retracted and the top and vehicle moved upwardly until the support arm 64 can be placed in position beneath the jacking pads on the lower surface of the vehicle body. This is accomplished by moving the pillars 21 horizontally along the girders 14 until directly opposite the jacking pads. The arm 64 is extended a distance sufficient to dispose the arm beneath the jacking pads, and the block 62 moved upwardly, bringing the arms 64 into engagement with the pads.

This having been accomplished, the top 12 may be lowered, allowing the arms 64 to support the vehicle body. The strain absorbed by the arm 64 is transmitted through the block and guide assembly to the housing and to the wheels 22. Spring 31, being unable to resist this force, permits the members 27 on the inner edge of the girder 14 to move outwardly, thus bringing the plate 33 on the bottom of the housing into engagement with the rail 19. This slight tipping movement also brings the lips 38 of the stabilizing hooks 37 into engagement with the rail 18. The actual angular tilting movement of pillar is very slight and is normally considered in the design of the pillar 21 and position of the arm 64 in the block 62. Usually the arm 64 is not truly horizontal when unloaded, but moves downwardly under the influence of the load to a truly horizontal position. With the body so supported, the drop table may safely lower the top 12 for movement to the release track, where the truck is discharged for service. Installation of a truck or axle assembly is accomplished by reverse operation.

In some instances, as for example where the capacity of the drop table is insufficient to properly elevate the vehicle, the pillars may be employed as jacks. In such instances screw 49 is usually connected by suitable gear train to a motor. It should not be understood that the screw 49 is essential, since other forms of jacking arrangements or lifting devices may be employed, as for example, opposed wedges, scissors jacks, hydraulic jacks, and the like, but in most instances the screw type will be found to be the most satisfactory.

The foregoing detailed description has been made in compliance with R. S. 4888, but since many modifications can obviously be incorporated without major change or revision, we do not bind ourselves to the hereinbefore described structure, except insofar as defined in the appended claims.

We claim:

1. Apparatus for supporting a railway vehicle body and the like comprising an elongated girder adapted for mounting near a shop floor parallel to a vehicle passageway and having a straight generally horizontal surface, an upwardly extending pillar slidably engaging said upper surface for movement along the girder, a block slidably engaging the pillar for generally vertical movement, a body support arm carried by the block and mounted for movement inwardly towards the vehicle, means for holding the block at a selected elevation on the pillar, and a stabilizing hook secured at one end to the pillar and having its opposite end disposed for engagement with a substantially horizontal surface on the girder outwardly from the center line thereof.

2. Apparatus for supporting the body of a railway vehicle and the like comprising a pair of parallel girders disposed on opposite sides of a vehicle passageway, each of said girders having a longitudinally extending restraining flange formed outwardly from the center of the girder, an upwardly extending pillar mounted on each of said girders for sliding along movement thereon, each of said pillars including a block slidably engaging the pillar for movement upwardly and downwardly, means for retaining said block in a selected position on the pillar, a body support arm carried by the block for horizontal inward movement towards a vehicle body, a stabilizing hook fastened to the pillar and extending downwardly to a point immediately below the restraining flange.

3. Apparatus for supporting the body of a railway vehicle and the like comprising a pair of parallel girders disposed on opposite sides of a vehicle passageway, each of said girders having a longitudinally extending restraining flange formed outwardly from the center of the girder, an upwardly extending pillar mounted on each of said girders for sliding along movement thereon, each of said pillars including a block slidably engaging the pillar for movement upwardly and downwardly, a jack for moving said block, a body support arm carried by the block for horizontal inward movement towards a vehicle body, a stabilizing hook fastened to the pillar and extending downwardly to a point immediately below the restraining flange.

4. Apparatus for supporting the body of a railway vehicle and the like comprising a pair of parallel girders disposed on opposite sides of a vehicle passageway, each of said girders having a longitudinally extending restraining flange formed outwardly from the center of the girder, an upwardly extending pillar mounted on each of said girders for sliding along movement thereon, each of said pillars including a block slidably engaging the pillar for movement upwardly and downwardly, a jack screw supported by the pillar and engaging the block for forcing said block upwardly and downwardly, means for retaining said block in a selected position on the pillar, a body support arm carried by the block for horizontal inward movement towards a vehicle body, and a stabilizing hook fastened to the pillar and extending downwardly to a point immediately below the restraining flange.

5. Apparatus for supporting the body of a railway vehicle and the like comprising an elongated girder adapted for mounting near shop floor level parallel to a vehicle passageway, said girder having an outer edge flange, an upwardly extending pillar, arms pivotally secured to the pillar and extending outwardly and downwardly therefrom, wheels journaled on each of said arms for longitudinal movement along the girder, resilient means for urging the lower ends of the arms towards the pillar, a block slidably engaging guides on the pillar for general vertical movement, a generally horizontal body support arm slidably supported by the block and movable inwardly beyond the inner edge of the girder for engagement with the vehicle body, mechanical means fixed with respect to the pillar for forcing the block upwardly, and a member secured to the pillar, a portion of said member being disposed for engagement with the flange on said girder when a load is applied to the said support arm inwardly from the pillar.

6. Apparatus for supporting the body of a railway vehicle and the like comprising an elongated girder adapted for mounting near shop floor level parallel to a vehicle passageway, said girder having an outer edge flange and an upwardly extending pillar, means for supporting the pillar for sliding movement along the girder, said means including spaced wheels movable along the inner and outer portions of the girder, and resilient means between the inner set of wheels and the pillar of sufficient strength to maintain the pillar out of contact with the girder only in the absence of a load on the pillar, a block slidably engaging guides on the pillar for generally vertical movement, a generally horizontal body support arm slidably supported by the block and movable inwardly beyond the inner edge of the girder for engagement with the vehicle body, mechanical means fixed with respect to the pillar for forcing the block upwardly, and a member secured to the pillar, a portion of said member being disposed for engagement with the flange on said girder when the upper end of the pillar is moved inwardly and downwardly.

7. In a load-supporting device, an upright pillar, spaced upright guide members, each pivotally secured at their upper ends to the pillar for movement about a generally horizontal axis, movable means carried by the pillar engaging the lower end of the guide, a block movable along said guide, means carried by the pillar for moving the block, and a load support arm projecting laterally from the block.

8. A load-supporting device comprising an upright hollow pillar, spaced upright guide members in the pillar, means near the upper extremity of the pillar for pivotally supporting the upper ends of the guide members, guide support members removably secured to the pillar for engaging the lower portions of the guides, a generally horizontal plate fixed with respect to the guides, an upright jack screw journaled in the plate, a block slidably engaging the guides and the jack screw, a generally horizontal load support arm carried by the block, and means for rotating the screw.

9. Apparatus for servicing the running gear of railway vehicles and the like for use in an area having a track intersected by a transverse pit, comprising a pair of spaced parallel girders spanning the pit at approximately shop floor level, a top between the girders spanning the pit, means for releasably securing the top to the girders, a drop table in the pit for raising and lowering the top, and an upwardly extending pillar slidably supported on each of the girders, each of the pillars including a block slidably supported by the pillar for generally vertical movement, a support arm carried by each block and movable inwardly for engagement with the body of a vehicle disposed on the top, and a stabilizer secured to the pillar and disposed for engagement with an outer portion of the girder upon application of a load to the support arm inwardly from the girder.

10. Apparatus for servicing the running gear of railway vehicles and the like comprising a girder adapted to be disposed approximately at shop floor level parallel to a vehicle body, an upwardly extending pillar slidable longitudinally along the girder, a block slidably engaging the girder for vertical movement, a generally horizontal body support arm projecting laterally from the block for engagement with the vehicle body, a jack carried by the pillar and engaging said block, means for actuating the jack, and a stabilizer member secured at one end to the pillar and having its other end disposed for engagement with a lower surface of the girder upon application of a load to the support arm inwardly from the girder.

11. Apparatus for servicing the running gear of railway vehicles and the like comprising a pair of parallel ridged support girders for mounting parallel to a vehicle track and on opposite sides thereof and an upright pillar slideably supported on each of the girders for horizontal movement thereon, each of the pillars having a block slideably mounted thereon for generally vertical movement, means for retaining the block in a selected position on the pillar, and a generally horizontal inwardly extending body support arm slideably carried by each of the blocks for engagement with opposite sides of a vehicle body.

12. Apparatus for servicing the running gear of railway vehicles and the like comprising a pair of parallel ridged horizontal support girders for mounting on opposite sides of a vehicle track and an upright pillar on each of the girders, each pillar having wheels supporting the pillar for sliding movement along the girder, at least one of the wheels having resilient mounting means urging the pillar away from the girder, each of the pillars also having a block mounted thereon for generally vertical sliding movement, a generally horizontal inwardly extending vehicle support arm slidably engaging the block and a ridged stabilizer member coupling the pillar to the girder when an inwardly overturning load is applied to the support arm.

LOUIS D. HOLMES.
WILLIAM J. HAAKSMA.
ROBERT S. HAMMOND.

REFERENCES CITED

The following references are of record in the file of this patent:

UNITED STATES PATENTS

| Number | Name | Date |
|---|---|---|
| 1,492,226 | Sjoberg | Apr. 29, 1924 |
| 2,212,695 | Nash | Aug. 27, 1940 |
| 2,454,225 | Skinner | Nov. 16, 1948 |